June 27, 1961  J. SLAPNIK  2,989,783
PLASTIC PROCESS

Filed Sept. 8, 1959  2 Sheets-Sheet 1

INVENTOR.
JOSEPH SLAPNIK
BY Oscar B. Brumback
his ATTORNEY.

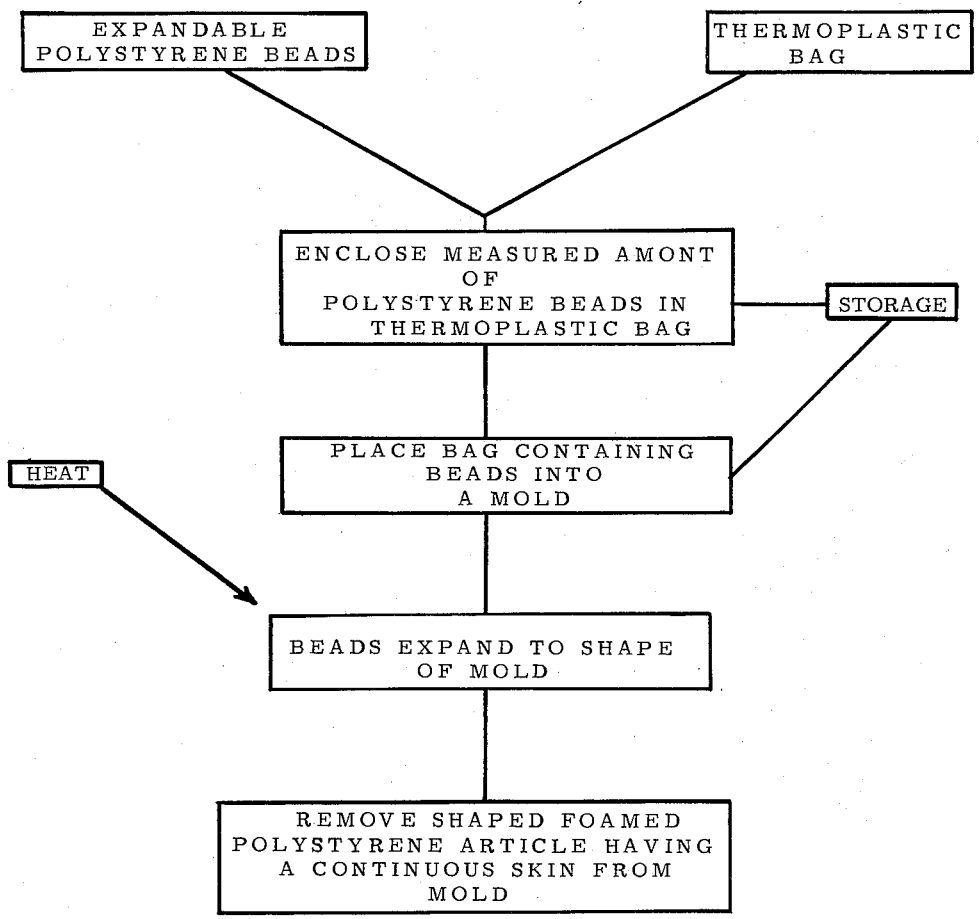

United States Patent Office 2,989,783
Patented June 27, 1961

2,989,783
PLASTIC PROCESS
Joseph Slapnik, San Gabriel, Calif., assignor to Koppers Company, Inc., a corporation of Delaware
Filed Sept. 8, 1959, Ser. No. 838,682
7 Claims. (Cl. 18—48)

This invention relates generally to a method for producing articles having a core of cellular polymeric material and more particularly to a method for producing plastic articles having a core of foam plastic material and having a surface that is not of foam material.

Shaped articles of cellular polymeric materials, particularly of styrene polymers, have found use in a wide variety of applications, such as packaging, refrigeration, insulating, and building. Cellular polymeric material, for example, is widely used in crash helmets, boats, rafts, life preservers, kickboards, and surfboards. Such articles of cellular polymeric materials are light in weight, have great strength in relation to their weight, have low water absorption, and good bouyancy and shock absorption. The surface of the article of cellular polymeric material, however, is sometimes not as resistant to various factors such as weather, flame, abrasion, or impact as would be desired. One way by which these characteristics are improved to some extent is by applying a protective coating to the surface of the completed article as, for example, painting the surface with an aqueous emulsion of a waterproofing compound. Another way is by lining the mold in which the article is made with a screen or fabric so that the lining becomes attached to the article. Each of these involves careful handling of the article or of the mold in which the article is made.

An object of this invention is to provide a novel article having a predetermined shape and a process for the production thereof, which article has a core of cellular polymeric structure and has a surface whose characteristics differ from the characteristics of the core, and yet does not involve additional handling of the article or mold.

Briefly, the invention comprises placing a quantity of foamable or expandable polymeric material in a bag of thermoplastic material, thereafter placing the bag with its contents in a mold, and expanding or foaming the polymeric material to produce an article having a surface of thermoplastic material and a core of cellular polymeric material, the foaming or expansion of the foamable or expandable material forces the bag to conform to the shape of the mold and the bag then forms the outer surface of the article.

The foamable or expandable polymeric material for use in this invention may advantageously be particles of polystyrene that have incorporated therein an expanding agent which expands the polymeric material when the material is subjected to the influence of heating. Typical of such expandable polymeric material is the expandable polystyrene which is sold by Koppers Company, Inc. under the name "Dylite" and which is in the form of particles or beads of polystyrene having incorporated therein from five to fifteen parts by weight of a low boiling hydrocarbon, such as pentane. When these particles of expandable polystyrene are heated to a temperature above the boiling point of the hydrocarbon but below the melting point of the beads, the beads expand; and when the material is confined during this expansion, the beads fuse together to form a foam mass having a discreet cell structure whose cell walls have considerable toughness. Then density of the mass is advantageously controlled by an operation, known as "pre-expanding," which involves partially expanding the particles of expandable polystyrene as individual particles to an extent that still permits the particles to expand further upon heating. Co-pending application Serial No. 689,195 filed October 9, 1957 by Hugh Rodman, Jr. and assigned to the assignee of this invention describes a pre-expanding process that comprises feeding expandable polymeric material into the bottom of a zone where the material is subjected, with agitation, to a steam atmosphere, whereupon the material expands, becomes lighter and rises to the top of the agitated material, and spills into a discharge chute. It should be recognized that while expandable polystyrene is particularly advantageous for use in the practice of this invention, other foamable or expandable polymeric materials, for example, expandable polyethylene, may be used.

The bag, which contains the expandable polymeric material and which forms the exterior surface of the article, if of a thermoplastic material. Conveniently, the bag may be formed of a woven cloth of such materials as polyethylene, polypropylene, polyamides, vinylidine chloride, and acrylics; such cloths of material under the tradenames nylon, Saran, Dynel, and Orlon being readily available. The cloth may be sewed or woven to the desired size. The bag may be of thermoplastic material in the nature of a continuous film which has been sealed to provide an air-tight bag. This has advantages. As would be expected with beads of expandable polystyrene, the beads tend to have a shelf life, that is, after a period of storage unless the container is completely closed, the volatile hydrocarbon tends to escape from the polymeric particles and the particles lose their ability to expand. But when the particles of polystyrene are placed in an air-tight bag of a desired size at the point of manufacture of polystyrene, this air-tight nature of the bag extends the storage life of the expandable polymeric material. In those cases in which the bag is made of material to which the cellular polymeric material does not readily adhere, the interior of the bag may be coated with an adhesive which becomes active under the influence of heat. Suitable adhesives, for example, are the epoxy resin type adhesives that set when heated.

Conveniently, the invention is carried out by placing the particles of expandable polystyrene in a bag that is made of thermoplastic material, inserting the bag and its contents into a mold, heating the expandable polystyrene to a temperature above the boiling point of the expanding agent but below the melting point of the polystyrene, whereupon the heat causes the particles to expand and fuse together to form a cellular core and causes the bag to soften so that the expansion of the particles (the beads may expand as much as thirty times their original volume) forces the bag to assume the shape of the mold. Thus, when the article is removed from the mold, the bag has assumed the contours of the mold thereby providing an article which has a foam core but a skin of material corresponding to the materials in the bag. To facilitate the loosening of the final shaped article from the wall of the mold, suitable separating agents, such as a silicate or a polyethylene oxide, may be applied to the wall of the mold. When the mold has intricate configurations with deep draws, it may be advantageous to form the bag so that the bag is more or less shaped to the contour of the part to be molded before it is filled with beads and before it is inserted into the final mold.

Heretofore, it had been necessary to dump the foamable or expandable polymeric material into the mold or to fill the mold by using a venturi and compressed air to blow the particles of polymeric material into special openings in the mold. These practices made quality control difficult because of lack of knowledge of the exact quantity of polymeric material in the mold or of lodging of the particle to form holes known as "blow holes." In accordance with this invention, the proper quantity of particles of expandable polymeric material can be delivered to the consumer in bags which are of the proper material and which have the proper peripheral dimensions. This packaging of the expandable polymeric material eliminates the need for care in filling the mold and for special handling and labor that goes into the filling of the mold at the point of molding and insures a uniformly high quality of product; through the use of this invention, the package of expandable polymeric material can be placed directly in the mold.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

In the drawings wherein like parts are marked alike:

FIGURE 4 is a flow sheet illustrating the novel method of filling a mold to produce the shaped, foamed polystyrene article having a continuous skin.

Figure 1:
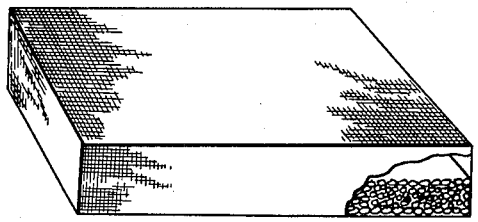
FIGURE 1 is a package of woven polypropylene containing expandable polystyrene.
Figure 2:
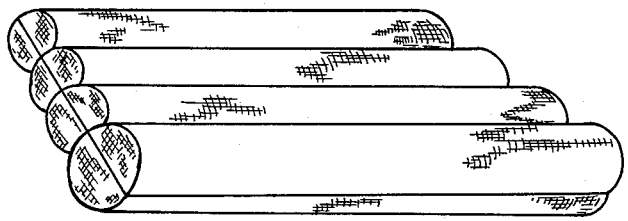
FIGURE 2 is a surfboard made from the package of FIGURE 1.

Turning now to FIGURE 1 a substantially rectangular package is made of loosely woven polyethylene. A measured quantity of expandable polystyrene sold under the trademark Dylite by Koppers Company, Inc. is enclosed in the package, the expandable polystyrene occupies approximately 10% of the space of the package. The package is placed in a mold which provides a shaped article that is a float as shown in FIGURE 2.

In producing the float and following the process described on pages 19–27 of the brochure entitled "Dylite Expandable Polystyrene," copyrighted 1954 by Koppers Company, Inc., steam at a pressure of 10 pounds per square inch is injected through probes into the mold for a period of two minutes to heat the material to a temperature of 250 to 275° F. The probes are then removed and the mold is immersed in water at room temperature to cool the mold. The mold is then opened, and the float shown in FIGURE 2 is removed. This float has a surface of woven polypropylene and a core of foam polystyrene.

Advantageously, the surface area of the package containing the expandable polymeric material should be substantially the same as the surface area of the finished article, but this is not critical because the thermoplastic material softens under the influence of heat and readily stretches.

Figure 3:
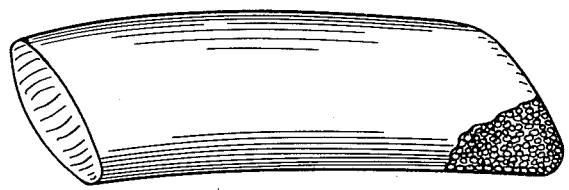
FIGURE 3 is a package made by sealing a film of polyethylene, the package containing expandable polystyrene.

The package shown in FIGURE 3 may be substituted for the package shown in FIGURE 1 in the mold. This package of FIGURE 3 is made by placing a desired quantity of expandable polystyrene on a sheet of polyethylene, folding the sheet, and heat sealing its edges. This package may be stored for an indefinitely long period but when it is to be used in the mold the package must be pierced at several points so as to permit steam and vapors to escape during the heating in the mold step of the process.

A method of producing a shaped, expanded polystyrene article having a continuous skin, as shown in FIGURE 4, consists of enclosing a measured amount of expandable polystyrene beads in a bag of thermoplastic material. The bag containing the enclosed expandable polystyrene beads is then stored for a subsequent molding operation or, if desired, immediately placed in a mold of predetermined configuration. The beads contained in the bag are in an amount corresponding to that amount which is necessary to completely fill the volume of the mold upon expansion of the beads. The bag containing the expandable polystyrene beads is then subjected to heat in the mold. The heat to which the beads are subjected can be derived from any of the well-known sources of heat for expanding polystyrene beads. The heat will cause the beads contained in the thermoplastic bag to soften, expand and fuse together to force the bag to conform to the shape of the mold and to adhere the bag to the surface of the fused, expanded beads. Thereafter, a shaped article conforming to the shape of a mold and having a surface of thermoplastic material and a core of a foamed, expanded polystyrene is removed from the mold.

While the foregoing has discussed the process known as "probe molding," it is to be recognized that the heating and molding may be carried out by any of the conventional processes. For example, a package such as FIGURE 1 may be filled with a quantity of expandable polystyrene, which polystyrene has been wetted by mixing therewith a material having a highpower loss factor such as a 3% solution of an alkylaryl sulfonate sold commercially as Nacconol NRSF, the package then placed in an open mold and heated electrically by high frequency waves in accordance with the method described in copending application Serial No. 705,540 of Edberg et al. which is assigned to the assignee of the present invention. The high frequency waves heat the polystyrene which expands and fuses to form the core and conform the polyethylene package to the shape of the mold. The mold thus has a core of foam polystyrene and an exterior surface of polyethylene.

Alternately, the package may be pre-molded, for example, by heating and forming on a die to the shape of the finished article, then may be filled with expandable polystyrene and thereafter heated in the mold in any of the conventional manners.

The foregoing has described a novel process for molding expandable plastic so as to obtain an article with an exterior of desired characteristics and an interior of foamed plastic.

The invention permits the production of articles having novel ornamental effects, for example the core may be of one color and the skin of another color. Thus, the article may be a cup, and the bag from which it is formed may be translucent and the polymeric foamable material colored.

The foregoing has also presented a novel arrangement for molding whereby the particles may be packed at the point of manufacture and shipped in the packaging. Thus, when the article reaches the molder it is only necessary for the molder to take the package and insert it into the mold. No further handling of the particles being necessary, and uniformity in weight and quality can be maintained.

I claim:

1. A mold-filling method to provide a shaped foamed polystyrene article having a continuous skin which comprises enclosing in a bag consisting of thermoplastic material, expandable polystyrene beads, placing said bag containing the enclosed expandable polystyrene beads in a mold, said beads contained in the bag being in an amount corresponding to that amount which is necessary to completely fill the volume of the mold upon expansion of the beads, subjecting said bag and its contents to heat whereupon the polystyrene beads of said bag soften, expand and fuse together to force said bag to conform to said mold and to adhere to the surface of the fused expanded beads and thereafter removing from said mold a shaped article conforming to the shape of the mold and having a surface of said thermoplastic material and a core of foamed expanded polystyrene.

2. A mold-filling method to provide a shaped foamed polystyrene article having a continuous skin which comprises conforming a bag of thermoplastic material to the shape of a mold, thereafter enclosing in said bag expandable polystyrene particles that are expandable under the influence of heat to produce a foam polymeric mass, placing said bag containing the polystyrene particles in a mold, said particles contained in the bag being in an amount corresponding to that amount which is necessary to completely fill the volume of the mold upon expansion of the beads and subjecting said bag and the enclosed polystyrene particles to heat whereupon the thermoplastic material of said bag softens and said expandable polystyrene particles expand and fuse together to force said bag to conform to said mold and adhere to the surface of the fused expanded beads and thereafter removing from said mold a shaped article conforming to the contours of the mold and having a surface of said thermoplastic material and a core of a closed cell expanded polystyrene mass.

3. In a process for filling a mold to produce a shaped article having a foamed polystyrene core and a continuous skin by subjecting expandable polystyrene particles to heat in a mold, the improvement which comprises enclosing said expandable polystyrene particles in a bag of thermoplastic material before the expandable particles are placed in the mold, said expandable polystyrene particles being in an amount corresponding to that amount necessary to completely fill the mold upon expansion of the particles, whereby the heat softens said thermoplastic material and the expandable polystyrene particles soften, expand and fuse together to force the thermoplastic material to conform to the contours of the mold and adhere to the surface of the particles and produce a shaped article having a surface which is comprised of said thermoplastic material and having a core which is comprised of said foamed polystyrene.

4. A process for producing a molded plastic foam material having a surface of thermoplastic material which comprises enclosing expandable polystyrene particles in a bag of thermoplastic material, placing said bag containing the enclosed expandable polystyrene particles into a mold, said particles being in an amount corresponding to that amount which is necessary to completely fill the volume of the mold, injecting steam into said bag to soften said thermoplastic material and soften, expand and fuse together said expandable particles to fill said mold with expanded polystyrene foam and to conform said thermoplastic material to said mold and thereafter removing from said mold an article having a skin of said thermoplastic material and a core of said polystyrene foam.

5. In a process for producing a shaped foamed polystyrene article having a continuous skin by filling a mold with expandable polystyrene particles and injecting steam into said mold to effect expansion of said particles to fill said mold with expanded polystyrene foam, the improvement which comprises enclosing said polystyrene particles in a bag of thermoplastic material, said polystyrene particles being in an amount corresponding to that amount necessary to completely fill the volume of the mold upon expansion of the particles and placing said bag and its contents in said mold prior to the injection of steam therein.

6. The method of claim 1 wherein the polymeric material that is expandable under the influence of heat is comprised of particles of polystyrene having incorporated therein from 5–15% of a low boiling hydrocarbon.

7. The method of claim 1 wherein the thermoplastic bag is comprised of woven cloth of polyethylene.

References Cited in the file of this patent

UNITED STATES PATENTS

| | | |
|---|---|---|
| 2,247,337 | Raflovich | June 24, 1941 |
| 2,635,742 | Swartz et al. | Apr. 21, 1953 |
| 2,816,652 | Clark | Dec. 17, 1957 |
| 2,877,503 | Puderbaugh et al. | Mar. 17, 1959 |
| 2,898,634 | Alderfer | Aug. 11, 1959 |

OTHER REFERENCES

Koppers Booklet, Dylite-expandable-polystyrene, 1954, page 34.